UNITED STATES PATENT OFFICE.

NATHANIEL C. FOWLER, JR., OF SOMERVILLE, MASSACHUSETTS; FANNIE A. FOWLER ADMINISTRATRIX OF SAID NATHANIEL C. FOWLER, JR., DECEASED.

COMPOSITION OF SUGAR AND METHOD OF PREPARING THE SAME.

1,374,160.   Specification of Letters Patent.   Patented Apr. 5, 1921.

No Drawing. Application filed August 8, 1916, Serial No. 113,763. Renewed April 16, 1918. Serial No. 228,969.

*To all whom it may concern:*

Be it known that I, NATHANIEL C. FOWLER, Jr., a citizen of the United States, residing at Somerville, in the county of Middlesex and State of Massachusetts, have invented new and useful Improvements in Compositions of Sugar and Methods of Preparing the Same, of which the following is a specification.

This invention relates to an improved sugar product and to the process of making the same. More particularly it relates to a new composition of fruit with sugar. It is an object of the invention to produce a product having the general characteristics of sugar plus those of some particular kind or kinds of fruit. So far as I am aware no fruit has ever been put into confectionery except in a whole or chopped state or except in so far as fruit which has been preserved with sugar is used in a whole or chopped state. It is an object of the present invention to provide a sugar product in which the flavor and food characteristics of fruit are present, the product itself having the general characteristic of sugar and being capable of use either in cookery or in confectionery making, or for eating without further preparation, as sugar is used. More particularly, the new product may be either in solid or liquid form, and if solid may be in large or small pieces, the fruit within it being not separately distinguishable, or at least not readily distinguishable from the other components of the product.

In making the product the fruit is first dried, either alone or with sugar. Various fruits may be used, as, for example, figs, dates, raisins, prunes. These particular named fruits it will be observed are all partially dried, but the process is not limited to such, as fresh figs, dates, grapes, etc., may be used. However the process is executed with greater facility if the fruit has already been subjected to a partial drying process, so that its natural juices have been converted or have disappeared by evaporation; and if any other fresh fruit such as peaches or apples is used it is desirable to desiccate it by some suitable process, as by cutting into slices and then subjecting to heat and evaporation, either a vacuum process or otherwise. Fruits such as oranges and grape fruit which can be dried somewhat when treated with sugar can also be used. The fruit thus partially dried is then comminuted. After this it is subjected to a more thorough drying, to get it into suitable condition for being ground very fine. During the drying process or otherwise the fruit may be subjected to a temperature sufficient to cook it, but it is generally preferable not to cook it, so that ordinarily the drying should be carried out at a temperature below 180° Fahrenheit. The advantage of this is that the characteristic flavor is better preserved than when the fruit is cooked.

Some partially dried fruit, such as figs, dates, prunes, etc., is ready immediately to be cut up fine, after removal of any seeds or other matter which is not desired in the finished product.

Fresh fruit is ready after it has been desiccated, and fruit which has been already dried with sugar as a preservative can be used without further preparation, whenever, in either case, a sufficiently solid consistency of the fruit has been reached with retention of such parts of the juice, pulp, etc., as do not pass off by evaporation. The material thus ready is then to be finely comminuted, for which a machine of the type of the well known meat choppers may be used, the material being passed through repeatedly until it is cut fine enough. In the case of raisins this step in the process is carried out more easily in the presence of powdered sugar; but, in general, this comminution may be carried out either with the fruit alone, or with added sugar. Preferably the fruit to be comminuted is first mixed with a suitable proportion of powdered sugar, and these two are passed through the machine together, producing a thorough intermixture. The use of previously ground sugar at this stage permits the process to be carried out with less requirement of power and with somewhat greater thoroughness. The fruit and sugar mixture should be further dried after the fruit has been cut into very small pieces. Before this drying the more or less sticky mass should however be broken up into small masses,—of the size of peas or less, an operation which may be performed by a suitable breaker or picker. If sufficient dry sugar be added or be present this can be done successfully. Then it is dried, either in vacuum or in air that is not too warm. This produces either the finished product, or a "base" from which the finished product can be made by addition of more sugar.

The fruit at this time consists mainly of the broken down fibrous or cellular structure of the frut, plus the fruit sugar and other derivatives of the original contents of the fruit, with such changes as have occurred therein in the drying. The mixture of this fruit with added sugar of different origin is therefore largely an admixture of one kind of sugar with another. Such fragments of the cellular or woody structure as remain may give some characteristic color to the mass, which will ordinarily be retained for the finished product. These can be separated, if desired, by heating the mass or otherwise liquefying it, and then passing it through a strainer. However, such minute parts of the cellular structure as remain with their fruit sugar contents, are preferably left incorporated, as also is such other residue of the original fruit as remains.

The foregoing assumes that the fruit is mixed with previously pulverized sugar before its comminution, for which purpose the proportion of added sugar in the whole mass that is ground may range as high as two-thirds. Most fruits (one exception being raisins) may however be comminuted and dried and ground alone, and afterward added to the sugar. In that case they may be added to sugar which is in liquid form, or to any kind of syrup. For the better drying of such fruits as raisins, dry sugar should be added, and water also may be added, being subsequently evaporated with moisture which originates in the fruit, after serving its purpose of helping extract sugar from the fruit cells, and helping to soften or weaken them, so that they dry out their contents more readily.

When dry the fruit can be ground very fine. If ground with sugar, more sugar may be added after the grinding. Or, sugar may be added for the grinding, an operation which is facilitated by the presence of dry sugar, in which case it may be added in desired proportion and thoroughly mixed.

Considered as a commercial product it may be desirable to prepare and sell the product in rather concentrated form, having a relatively high proportion of fruit. The user can by adding sugar have practically any desired strength of fruit in his ultimate product, blending it according to taste. The presence of the sugar with the fruit provides abundantly for the preservation of the fruit without separate sterilization.

The product can be used for making confectionery by the addition of milk or water, eggs and other ingredients according to the confectioner's art substantially as sugar is now used, with or without cooking. The product can also be used for frosting, cake filling, and in other respects as sugar is used, but is characterized always by the fruit ingredient. This characteristic is not merely a flavor, but owing to the physical presence of the solids and residuum of the evaporated juices amounts practically to an embodiment of the fruit in a sugar.

Sugar of various kinds may be employed, or sugar substitutes, such as confectioner's sugar, granulated sugar, maple sugar, grape sugar, glucose, and others, the word "sugar" herein being employed in a broad sense as including its substitutes.

It is intended that the patent shall cover, by suitable expression, in the appended claims, whatever features of patentable novelty exist in the invention disclosed.

I claim as my invention:

1. A composition comprising a mixture of sugar and fruit, in form suitable for domestic uses, consisting mainly of sugar in finely divided state, with which is combined a product derived from the fine grinding of fruit and so free from lumps and fibers that the particles thereof are not readily distinguishable in the mixture.

2. A composition suitable for use in cookery and having the general characteristics of sugar as prepared for domestic uses and containing finely ground fruit in quantity sufficient to give the composition the flavor and food characteristics of the fruit.

3. A composition suitable for use in cookery and having the general characteristics of sugar as prepared for domestic uses, comprising the mixture of sugar with finely ground fruit particles: the said fruit particles being derived from the grinding of previously dried fibers and pulpy parts of fruit and being so finely ground as to approximate the size of the sugar grains.

4. A process of making a sugar composition including the drying of fruit until its natural juices have disappeared as juices, the fine grinding of the fibrous and pulpy parts thereof till distinctive characteristics of fruit lumps disappear, and the mixing thereof at some stage during the process with a sufficient excess of sugar to cause the whole to have the general characteristics of sugar.

5. A process of making a sugar composition including the drying of fruit until its natural juices have disappeared as juices, the mixing thereof with finely divided sugar at some stage during the process, and the fine grinding of the fruit while associated with the sugar.

6. A process of making a sugar composition, including the partial drying of fruit until its natural juices have mostly disappeared as juices, the comminuting and mixing of it with sugar, the further drying of it in presence of sugar, and the fine grinding of the further dried comminuted material.

7. A process of making a sugar composition, including the partial drying of fruit until its natural juices have mostly disappeared as juices, the comminuting and mixing of it with sugar, the further drying of it in presence of sugar, and the fine grinding of the further dried comminuted material followed by the removing of small particles of fruit fiber.

8. A process of making a sugar composition, including the partial drying of fruit until its natural juices have mostly disappeared as juices, the comminuting of it with addition of water and mixing with sugar, the further drying of it in presence of sugar, and the fine grinding of the dried comminuted material.

Signed by me at Provincetown, Mass., this fourth day of August, 1916.

NATHANIEL C. FOWLER, Jr.

Witnesses:
WILLIAM S. BIRGER,
ETHEL P. HUNTING.